US008137192B2

(12) United States Patent
Thomas

(10) Patent No.: US 8,137,192 B2
(45) Date of Patent: Mar. 20, 2012

(54) HANDHELD GAMING SYSTEM HAVING DYNAMICALLY ADJUSTING INTERFACES AND DISPLAYS

(75) Inventor: Alfred Thomas, Las Vegas, NV (US)

(73) Assignee: WMS Gaming Inc., Waukegan, IL (US)

( * ) Notice: Subject to any disclaimer, the term of this patent is extended or adjusted under 35 U.S.C. 154(b) by 437 days.

(21) Appl. No.: 12/513,469

(22) PCT Filed: Oct. 19, 2007

(86) PCT No.: PCT/US2007/022315
§ 371 (c)(1),
(2), (4) Date: May 4, 2009

(87) PCT Pub. No.: WO2008/057191
PCT Pub. Date: May 15, 2008

(65) Prior Publication Data
US 2010/0016075 A1 Jan. 21, 2010

Related U.S. Application Data

(60) Provisional application No. 60/856,990, filed on Nov. 6, 2006.

(51) Int. Cl.
*A63F 13/12* (2006.01)
(52) U.S. Cl. ......................................... 463/31
(58) Field of Classification Search ................... 463/30, 463/31
See application file for complete search history.

(56) References Cited

U.S. PATENT DOCUMENTS

| 6,270,410 | B1 | 8/2001 | DeMar et al. |
| 6,523,124 | B1 | 2/2003 | Lunsford et al. |
| 2001/0044337 | A1 | 11/2001 | Rowe et al. |
| 2002/0163778 | A1 | 11/2002 | Hazzard et al. |
| 2003/0006968 | A1 | 1/2003 | Solomon |
| 2003/0064805 | A1 | 4/2003 | Wells |
| 2004/0110532 | A1 | 6/2004 | Ochi et al. |
| 2005/0024816 | A1 | 2/2005 | Marappan |

FOREIGN PATENT DOCUMENTS

| JP | 2001154990 | 6/2001 |
| WO | WO 02/058020 A2 | 7/2002 |

OTHER PUBLICATIONS

International Search Report—International Application No. PCT/US2007/022315; Filed Oct. 19, 2007—Dated: Jul. 29, 2008 (5 pages).

*Primary Examiner* — Evan Pert
(74) *Attorney, Agent, or Firm* — Nixon Peabody LLP

(57) ABSTRACT

A gaming system comprises a handheld gaming device having a first display for displaying a wagering game. The system further comprises a wager input device in communication with the handheld gaming device. The system includes a detector for detecting at least one external input device connected to the handheld gaming device. The system further comprises a controller operative to cause the first display to display a first format of the wagering game if connection with the at least one external input device is not detected by the detector, and cause the first display to display a second format of the wagering game if connection with the at least one external input device is detected by the detector.

20 Claims, 7 Drawing Sheets

HANDHELD GAMING SYSTEM HAVING DYNAMICALLY ADJUSTING INTERFACES AND DISPLAYS

CROSS REFERENCE TO RELATED APPLICATIONS

This application is a U.S. national stage of International Application No. PCT/US2007/022315, filed Oct. 19, 2007, which is related to and claims priority from U.S. Provisional Application No. 60/856,990, filed Nov. 6, 2006, which is incorporated herein by reference in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to a handheld gaming system having dynamically adjusting interfaces and displays.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming systems with new types of bonus games to satisfy the demands of players and operators.

In addition to free standing gaming machines, recent innovations have included development of mobile and handheld gaming devices. Handheld gaming devices may be configured to operate independently of other gaming system components, or may be in communication with such components by either direct wired or wireless communications, or via a network. One problem that exists is that handheld gaming devices provide a limited number of configurations and input devices due to size constrictions and power requirements. Moreover, handheld devices which are in communication with other gaming and casino system components may provide duplicative or unnecessary interfaces and display redundant information to the player. The present invention is directed to solving these and other problems.

SUMMARY OF THE INVENTION

According to one aspect of the present invention, a gaming system for conducting a wagering game comprises a handheld gaming device having a first display for displaying a wagering game. The system further comprises a wager input device in communication with the handheld gaming device. The system includes a detector for detecting at least one external input device connected to the handheld gaming device. The system further comprises a controller operative to cause the first display to display a first format of the wagering game if connection with the at least one external input device is not detected by the detector, and cause the first display to display a second format of the wagering game if connection with the at least one external input device is detected by the detector.

According to another aspect of the invention, a method of conducting a wagering game on a gaming system comprises receiving a wager via a wager input device and displaying a first format of the wagering game on a display of a handheld gaming device. The method further comprises detecting at least one external input device connected to the handheld gaming device. The method further comprises, in response to the detection, reconfiguring the display to display a second format of the wagering game.

According to yet another aspect of the invention, a handheld gaming device for conducting a wagering game comprises a housing and at least one grip coupled to the housing. The handheld gaming device further comprises a display supported by the housing, the display displaying a randomly selected outcome of the wagering game. The display further displays a plurality of input selections, the input selections located proximate the at least one grip. The handheld gaming device further comprises a touch screen overlaying at least a portion of the display including the input selections, the touch screen for receiving user selection of the input selections.

According to yet another aspect of the invention, a computer readable storage medium is encoded with instructions for directing a gaming system to perform the above method.

Additional aspects of the invention will be apparent to those of ordinary skill in the art in view of the detailed description of various embodiments, which is made with reference to the drawings, a brief description of which is provided below.

DETAILED DESCRIPTION

Figure 1A:
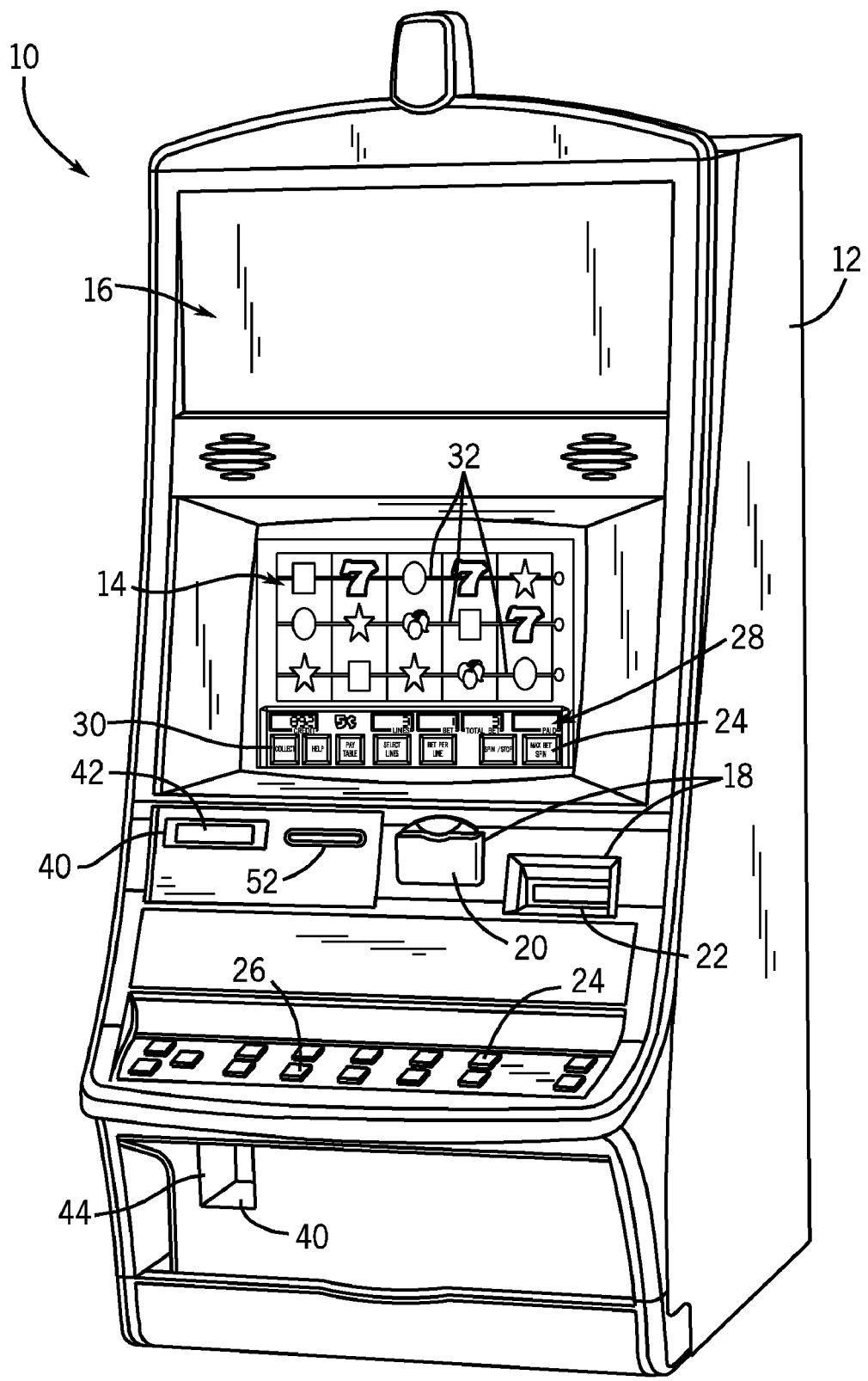
FIG. 1a is a perspective view of a free standing gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1a, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1a). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1a, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. Alternatively, the primary display 14 of the gaming machine 10 may include a number of mechanical reels to display the outcome in visual association with at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1a as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 1B:
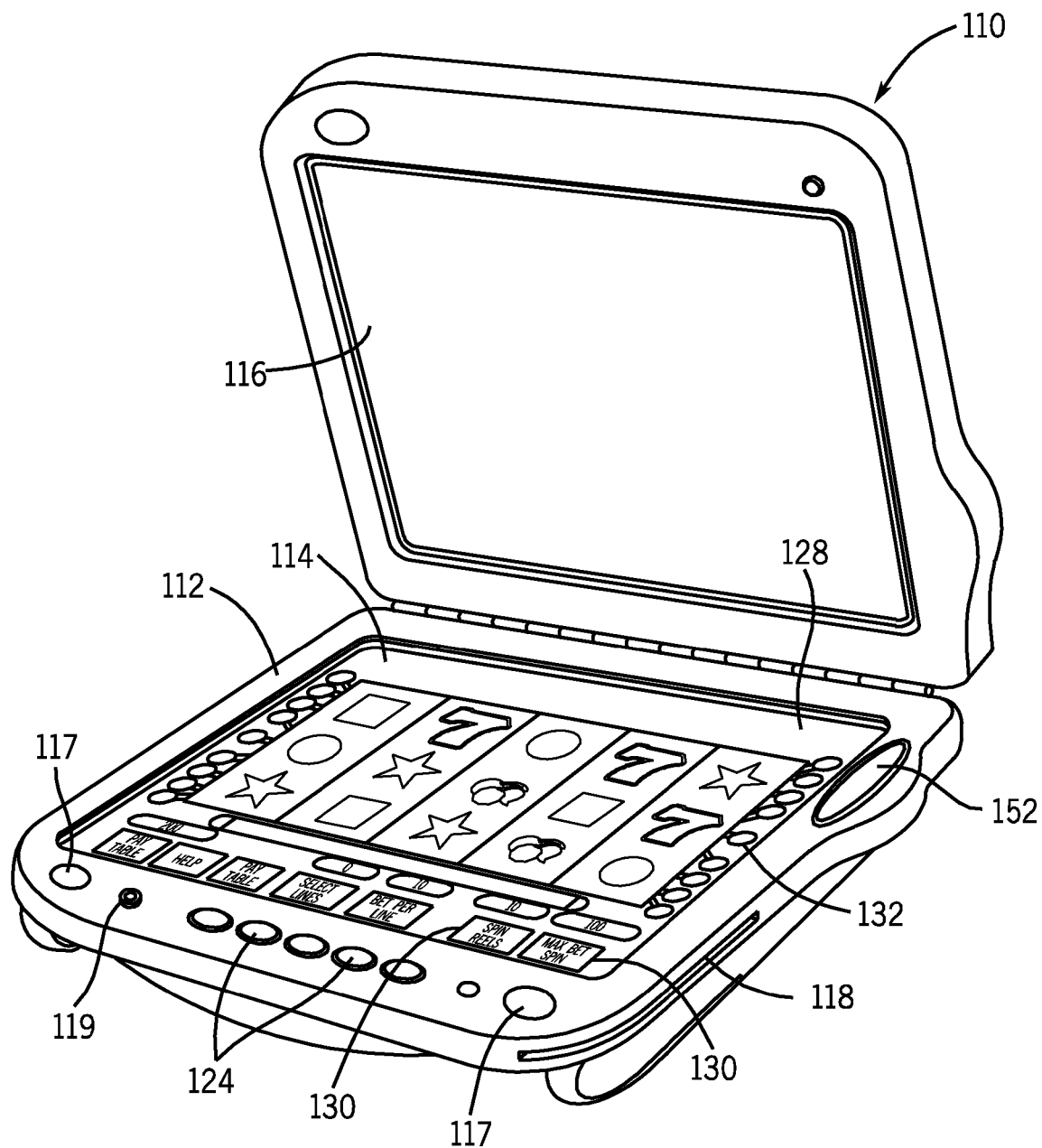
FIG. 1b is a perspective view of a handheld gaming machine embodying the present invention.

Depicted in FIG. 1b is a handheld or mobile gaming machine 110. Like the free standing gaming machine 10, the handheld gaming machine 110 is preferably an electronic gaming machine configured to play a video casino game such as, but not limited to, blackjack, slots, keno, poker, blackjack, and roulette. The handheld gaming machine 110 comprises a housing or casing 112 and includes input devices, including a value input device 118 and a player input device 124. For output the handheld gaming machine 110 includes, but is not limited to, a primary display 114, a secondary display 116, one or more speakers 117, one or more player-accessible ports 119 (e.g., an audio output jack for headphones, a video headset jack, etc.), and other conventional I/O devices and ports, which may or may not be player-accessible. In the embodiment depicted in FIG. 1b, the handheld gaming machine 110 comprises a secondary display 116 that is rotatable relative to the primary display 114. The optional secondary display 116 may be fixed, movable, and/or detachable/attachable relative to the primary display 114. Either the primary display 114 and/or secondary display 116 may be configured to display any aspect of a non-wagering game, wagering game, secondary games, bonus games, progressive wagering games, group games, shared-experience games or events, game events, game outcomes, scrolling information, text messaging, emails, alerts or announcements, broadcast information, subscription information, and handheld gaming machine status.

The player-accessible value input device 118 may comprise, for example, a slot located on the front, side, or top of the casing 112 configured to receive credit from a stored-value card (e.g., casino card, smart card, debit card, credit card, etc.) inserted by a player. In another aspect, the player-accessible value input device 118 may comprise a sensor (e.g., an RF sensor) configured to sense a signal (e.g., an RF signal) output by a transmitter (e.g., an RF transmitter) carried by a player. The player-accessible value input device 118 may also or alternatively include a ticket reader, or barcode scanner, for reading information stored on a credit ticket, a card, or other tangible portable credit or funds storage device. The credit ticket or card may also authorize access to a central account, which can transfer money to the handheld gaming machine 110.

Still other player-accessible value input devices 118 may require the use of touch keys 130 on the touch-screen display (e.g., primary display 114 and/or secondary display 116) or player input devices 124. Upon entry of player identification information and, preferably, secondary authorization information (e.g., a password, PIN number, stored value card number, predefined key sequences, etc.), the player may be permitted to access a player's account. As one potential optional security feature, the handheld gaming machine 110 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value input device 118 may itself comprise or utilize a biometric player information reader which permits the player to access available funds on a player's account, either alone or in combination with another of the aforementioned player-accessible value input devices 118. In an embodiment wherein the player-accessible value input device 118 comprises a biometric player information reader, transactions such as an input of value to the handheld device, a transfer of value from one player account or source to an account associated with the handheld gaming machine 110, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 118 comprising a biometric player information reader may require a confirmatory entry from another biometric player information reader 152, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 118 may be provided remotely from the handheld gaming machine 110.

The player input device 124 comprises a plurality of push buttons on a button panel for operating the handheld gaming machine 110. In addition, or alternatively, the player input device 124 may comprise a touch screen mounted to a primary display 114 and/or secondary display 116. In one aspect, the touch screen is matched to a display screen having one or more selectable touch keys 130 selectable by a user's touching of the associated area of the screen using a finger or a tool, such as a stylus pointer. A player enables a desired function either by touching the touch screen at an appropriate touch key 130 or by pressing an appropriate push button 126 on the button panel. The touch keys 130 may be used to implement the same functions as push buttons 126. Alternatively, the push buttons may provide inputs for one aspect of the operating the game, while the touch keys 130 may allow for input needed for another aspect of the game. The various components of the handheld gaming machine 110 may be connected directly to, or contained within, the casing 112, as seen in FIG. 1b, or may be located outboard of the casing 112 and connected to the casing 112 via a variety of hardwired (tethered) or wireless connection methods. Thus, the handheld gaming machine 110 may comprise a single unit or a plurality of interconnected parts (e.g., wireless connections) which may be arranged to suit a player's preferences.

The operation of the basic wagering game on the handheld gaming machine 110 is displayed to the player on the primary display 114. The primary display 114 can also display the bonus game associated with the basic wagering game. The primary display 114 preferably takes the form of a high resolution LCD, a plasma display, an LED, or any other type of display suitable for use in the handheld gaming machine 110. The size of the primary display 114 may vary from, for example, about a 2-3" display to a 15" or 17" display. In at least some aspects, the primary display 114 is a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 116 may have a 16:9 aspect ratio or other aspect ratio (e.g., 4:3). The primary display 114 and/or secondary display 116 may also each have different resolutions, different color schemes, and different aspect ratios.

As with the free standing gaming machine 10, a player begins play of the basic wagering game on the handheld gaming machine 110 by making a wager (e.g., via the value input device 18 or an assignment of credits stored on the handheld gaming machine via the touch screen keys 130, player input device 124, or buttons 126) on the handheld gaming machine 110. In at least some aspects, the basic game may comprise a plurality of symbols arranged in an array, and includes at least one payline 132 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the player-accessible value input device 118 of the handheld gaming machine 110 may double as a player information reader 152 that allows for identification of a player by reading a card with information indicating the player's identity (e.g., reading a player's credit card, player ID card, smart card, etc.). The player information reader 152 may alternatively or also comprise a bar code scanner, RFID transceiver or computer readable storage medium interface. In one presently preferred aspect, the player information reader 152, shown by way of example in FIG. 1*b*, comprises a biometric sensing device.

Figure 2:
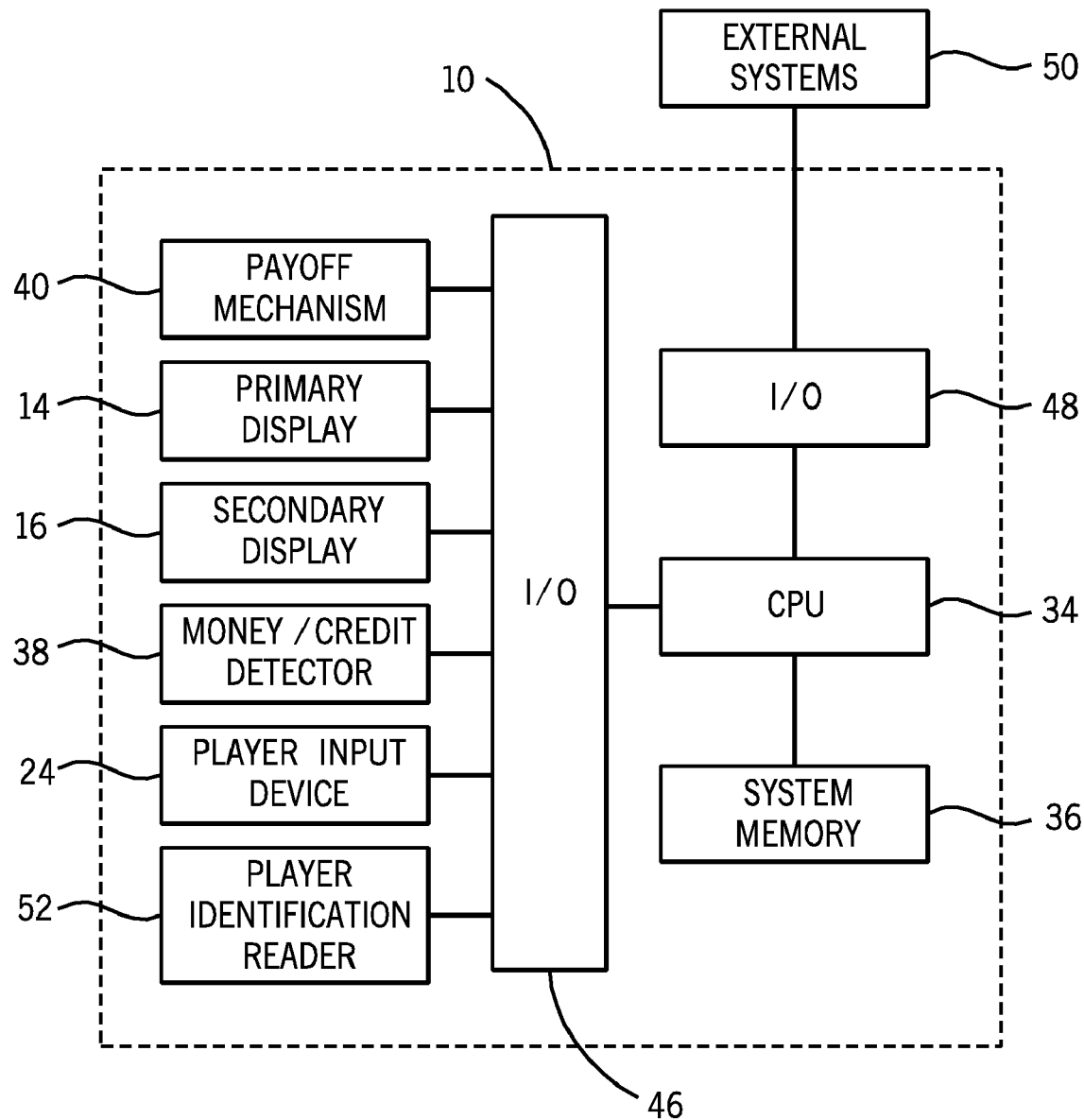
FIG. 2 is a block diagram of a control system suitable for operating the gaming machines of FIGS. 1a and 1b.

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1*a*, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10 bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36. The controller 34 may reside partially or entirely inside or outside of the machine 10. The control system for a handheld gaming machine 110 may be similar to the control system for the free standing gaming machine 10 except that the functionality of the respective on-board controllers may vary.

The gaming machines 10,110 may communicate with external systems 50 (in a wired or wireless manner) such that each machine operates as a "thin client," having relatively less functionality, a "thick client," having relatively more functionality, or through any range of functionality there between. As a generally "thin client," the gaming machine may operate primarily as a display device to display the results of gaming outcomes processed externally, for example, on a server as part of the external systems 50. In this "thin client" configuration, the server executes game code and determines game outcomes (e.g., with a random number generator), while the controller 34 on board the gaming machine processes display information to be displayed on the display(s) of the machine. In an alternative "thicker client" configuration, the server determines game outcomes, while the controller 34 on board the gaming machine executes game code and processes display information to be displayed on the display(s) of the machines. In yet another alternative "thick client" configuration, the controller 34 on board the gaming machine 110 executes game code, determines game outcomes, and processes display information to be displayed on the display(s) of the machine. Numerous alternative configurations are possible such that the aforementioned and other functions may be performed onboard or external to the gaming machine as may be necessary for particular applications. It should be understood that the gaming machines 10,110 may take on a wide variety of forms such as a free standing machine, a portable or handheld device primarily used for gaming, a mobile telecommunications device such as a mobile telephone or personal daily assistant (PDA), a counter top or bar top gaming machine, or other personal electronic device such as a portable television, MP3 player, entertainment device, etc.

Figure 3:
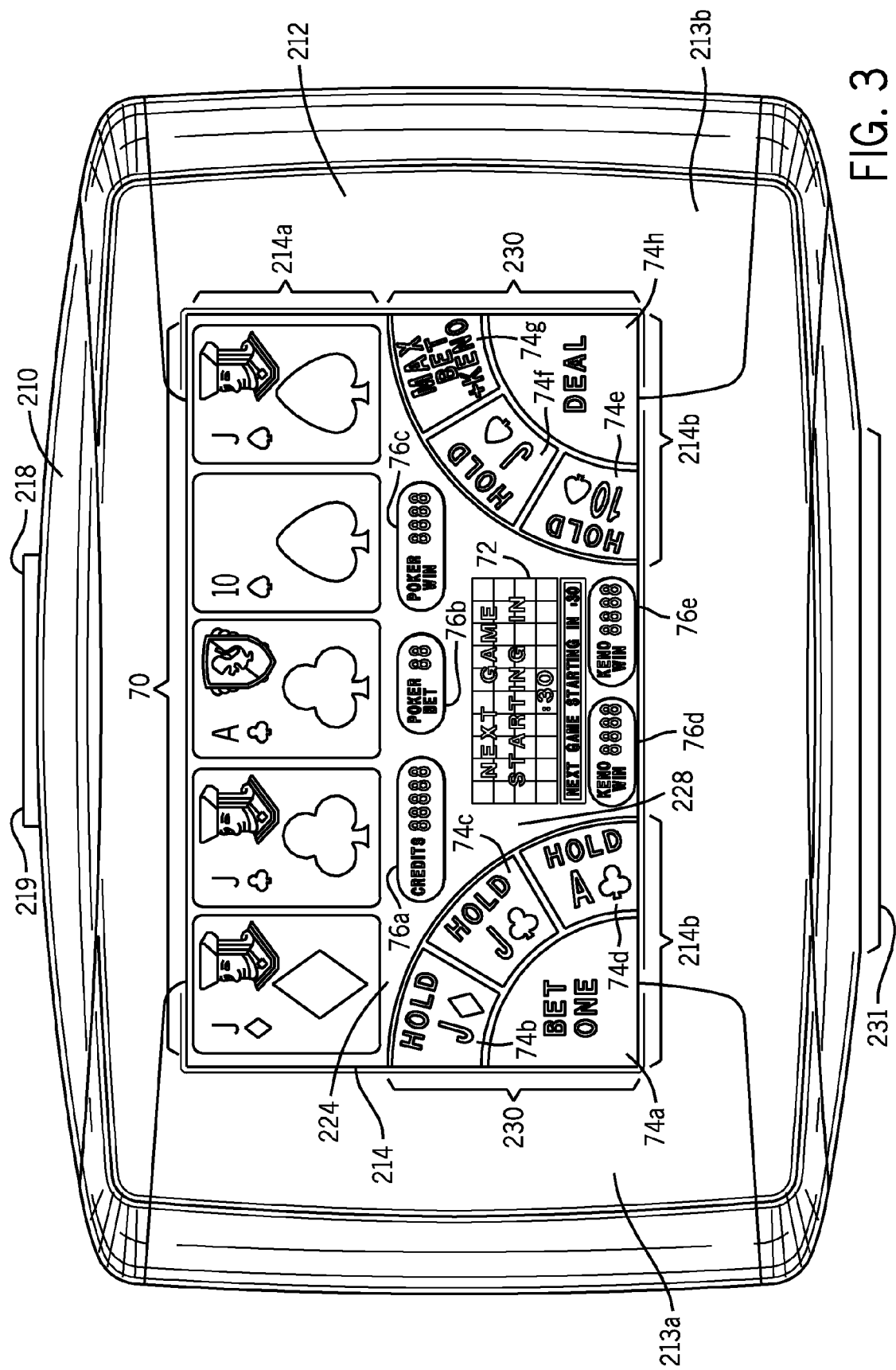
FIG. 3 is a front view of a handheld gaming device.

Turning now to FIG. 3, the front view of an embodiment of a handheld gaming device 210 is depicted. The handheld device 210 includes a housing or casing 212 and a primary display 214 supported by the housing 212. In this embodiment, the primary display 214 is a high resolution LCD display located on a front surface of the housing 212. Other displays, such as a secondary display, may be used instead of, or in addition to, the primary display 214, as described herein with reference to FIG. 1b. On opposing ends of the housing 212 are a pair of handles or grips 213a,b which facilitate holding the handheld gaming device 210. Each grip 213a,b, provides a comfortable location on the housing 212 to hold the handheld device 210 during game play, as described herein. The grips 213a,b are constructed of a resilient material such as plastic or rubber to provide comfort to the player holding the handheld device 210. The grips 213a,b may also be ergonomically contoured to the shape of a player's hand so as to provide maximum comfort.

The handheld gaming device 210 also includes one or more player-accessible value input devices 218. In this embodiment, the value input device 218 comprises a slot 219 located near the top of a rear surface of the housing 212. The slot 219 is configured to receive and read a card inserted by the player, wherein the card stores, among other things, value input in the form of a quantity of credit value or cash stored in an account. In this way, the card transfers value input to the handheld gaming device 210 via the slot 219. In alternative embodiments, the value input device 218 may include other components and funding mechanisms other than the card slot 219, such as those discussed herein with reference to FIG. 1b herein. The handheld gaming device 210 also includes at least one controller 34 as described herein with reference to FIGS. 1-2.

The handheld gaming device 210 further comprises a player input device 224, which in this embodiment is a touch screen 228 which overlays the primary display 214. The touch screen 228 comprises soft touch keys 230 denoted by graphics on the underlying primary display 214 and are used to provide inputs from the player during play of the handheld gaming device 210, and to otherwise control the device 210. The handheld gaming device 210 is operated under the control of one or more processors (not shown, but described herein with reference to FIGS. 1-2) which are in communication with the primary display 214. The one or more processors may be onboard of the handheld device 210 and located within the housing 212, or may be outboard of the housing 212 and in communication with the components of the handheld device 210 through one or more wired or wireless connection methods. In the embodiment shown in FIG. 3, the player input device 224 does not include any mechanical, electromechanical or other push buttons, but these may be included in alternative embodiments.

The handheld gaming device 210 further includes one or more external connection ports 231 for connecting to and/or communicating with one or more external devices. Thus, in an embodiment, the connection port 231 facilitates physical connection between the handheld device 210 and an external device 300. In this embodiment, the external connection port 231 comprises a docking connection which mates with a complimentary docking connection on an external device. In other embodiments, the external connection port 231 may alternatively, or additionally, include other wired or contact connections, as well as a variety of different wireless connections or communication devices, which facilitate communication between the handheld device 210 and other devices. Thus, when the handheld device 210 is "connected to" or "in connection" with another device, such connection could be (i) a physical connection, (ii) an electrical connection, (iii) a magnetic connection, (iv) in communication with (wired or wirelessly), or (v) any combination of such connections and/or communications. In this way, the term "connection" or "connected to" encompasses any form of communication, linkage, coupling, or association, whether physical, electrical, magnetic, wireless, etc.

In FIG. 3, the display 214 of the handheld gaming device 210 displays a first format of a wagering game. In this embodiment, the wagering game is a combined poker and keno wagering game. However, in alternative embodiments, any number of different wagering games, or formats thereof, may be displayed and executed, as described with relation to FIGS. 1-2 herein. The first format of the wagering game includes a plurality of cards 70 positioned along the top of the primary display 14 for displaying a poker game. The first format of the wagering game further includes a keno game 72 positioned on the lower center portion of the primary display 14 for displaying the keno game. In addition to these games, the first format of the wagering game includes a plurality of input selections 74 with which a player provides selection inputs to control the wagering game on the handheld device 210. In this embodiment, the input selections 74 include a BET button 74a, five HOLD buttons 74b,c,d,e,f corresponding to the five cards 70 used in the poker game, a MAX BET+KENO button 74g for inputting a wager which is the maximum wager allowed on the handheld device 210, and a DEAL/DRAW button 74h for commencing the deal of a new poker hand or drawing replacement cards 72 for the poker hand.

In some embodiments, as seen in FIG. 3, some of the input selections 74 may include additional information. For example, the five HOLD buttons 74b-f, in addition to the word "HOLD", may also include indicia of the cards 70 to which the selections 74b-f correspond. Thus, in FIG. 3, each of the HOLD buttons 74b-f includes an image of the rank and suit of the card 70 to which it corresponds (jack of diamonds, jack of clubs, ace of clubs, ten of spades, and jack of spades). The first format of the wagering game, in this embodiment, also include a plurality of information fields 76, which include a credit meter 76a, a poker bet meter 76b, a poker win meter 76c, a keno bet meter 76d, and a keno win meter 76e. These information fields 76 provide information to the player via the primary display 214 related to the status of present and past games played on the handheld device 210. The information fields 76 may optionally include labels thereon, as seen in FIG. 3.

Moreover, in the first format of the wagering game, the primary display 214 is divided into at least two display regions 214a,b. The elements depicting the wagering game, its outcome, and information about the game are in the first region 214a while the second region 214b is dedicated to display of the input selections 74. Therefore, in this embodiment, the first region 214a includes the cards 70 of the poker game, the keno game 72, and the information fields 76, while the relevant input selections 74 are in the second region 214b of the display 214. In alternative embodiments, the display 214 may be otherwise divided into regions, or may not be divided at all.

In this embodiment, the input selections 74 in the first format of the wagering game are all actuated via the touch screen 228. The touch screen 228 includes soft keys 230 which correspond to each of the input selections 74 available to the player. As can be seen in FIG. 3, all of the input selections 74 are proximate the lower right and lower left hand corners of the primary display 214 so as to be proximate the grips 213a,b of the handheld device 210. In this way, a player who holds the handheld device 210 by the grips 213a,b with two hands is able to easily access the soft keys 230 corresponding to the input selections 74. Specifically, the player may use his thumbs to touch the touch screen 228 in the area of the input selections 74. The input selections 74 are divided into two groups, such that the first group 74a,b,c,d is proximate the first grip 213a and the second group 74e,f,g,h is proximate the second grip 213b. Because the important or relevant input selections 74 are all proximate the grips 213a,b, the player may play the wagering game more easily, more quickly, and without having to readjust or remove his hands, his grip, or his finger position to perform various tasks associated with operation of the handheld device 210. This results in an ergonomic configuration of the input selections 74 which in turn allows ease of play without undue fatigue or strain.

Figure 4:
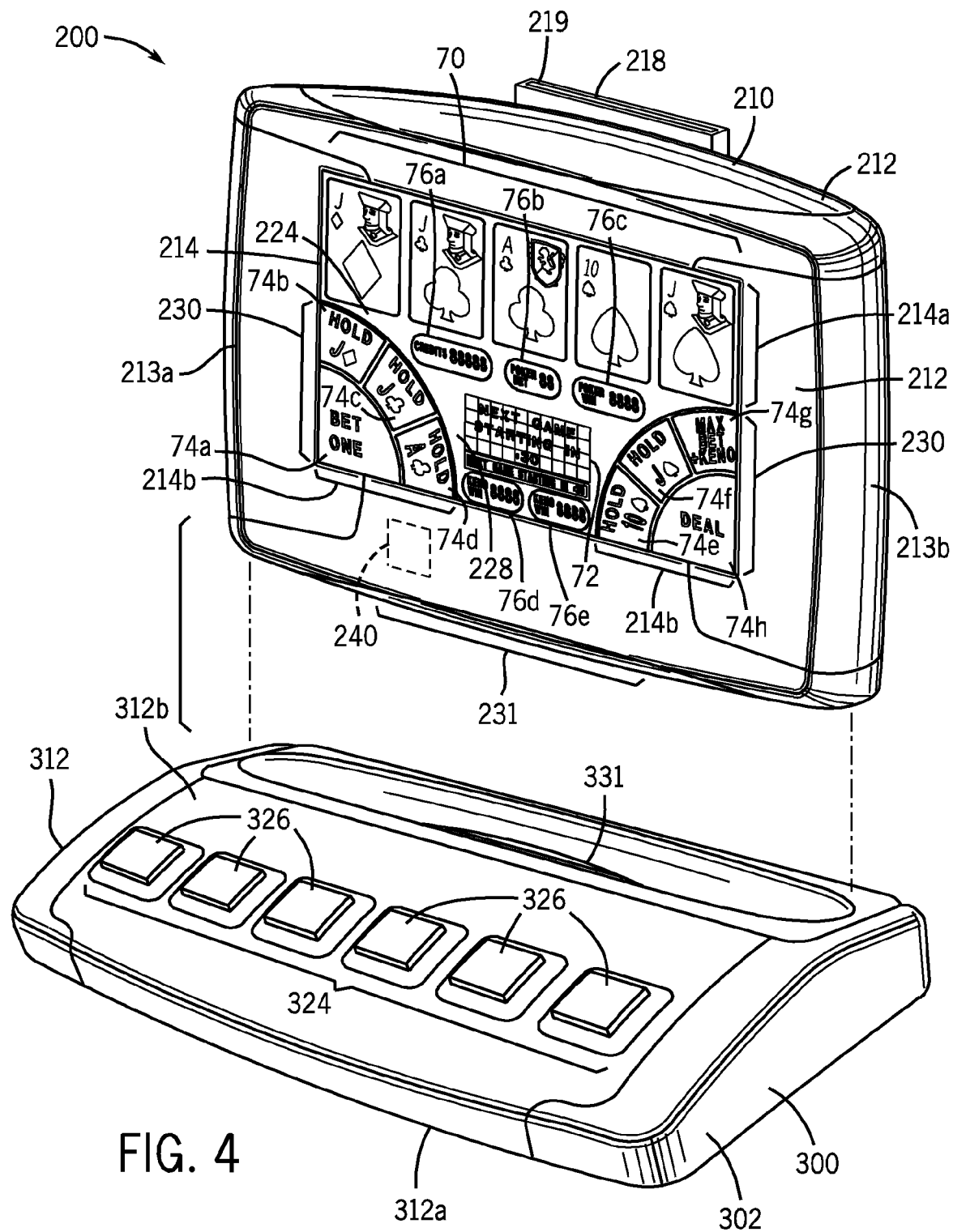
FIG. 4 is a perspective view of a gaming system according to the present invention, including the handheld gaming device of FIG. 3.

In FIG. 4, a handheld gaming system 200 is shown. The system comprises the handheld gaming device 210 (seen in FIG. 3) and an external input device 300. An exemplary external input device 300 is depicted, which in this embodiment is a docking station 302. The docking station 302 includes a housing 312, a player input device 324, and an external connection port 331. The housing 312 is made of rigid plastic material and is designed to be substantially flat on a bottom surface 312a of the housing 312, so that the docking station 302 may sit on a table top, fat surface or the like. The player input device 324 is located on a front portion of a top surface 312b of the housing 312. In this embodiment, the player input device 324 comprises a plurality of push buttons 326. In alternate embodiments, various other input devices 324 may be used, including joysticks, keypads, various buttons, trackballs, or a keyboard. The external connection port 331 is a docking port which physically receives and connects with a handheld gaming device 210, as shown in FIGS. 3-4. The external connection port 331 may physically connect with the handheld device 210 while communications between the devices 210,302 take place over another wired connection, or wireless. Alternatively, the external connection port 331 may serve as both a physical connection and a communication pathway between the devices 210,302. The docking station 302 further includes a power source (not shown), which may be in the form of a power plug drawing external power, or an internal battery located inside of the housing 312. The power source provides power to the docking station 302, and optionally to any other devices in communication with the docking station 302, via the connection port 331, or otherwise.

As seen in FIG. 4, the housing 212 of the handheld device 210 is contoured in shape so as to be received by the external connection port 331 of the docking station 302. In an embodiment, the external connection port 331 further includes a steel plate therein which bonds magnetically to a pair of magnets on the housing 212 of the handheld device 210, proximate the external connection port 231, to secure the device 210 to the docking station 302, and to maintain connection therebetween. The handheld device 210 is disconnected from the docking station 302 in FIG. 4, and is this "undocked." The handheld gaming system 200 includes a detector 240 for detecting connection between the handheld device 210 and one or more external input devices 300. The detector 240 may be located on or inside of the housing 212 of the handheld device 210. Alternatively, the detector 240 may be located on or inside the housing 312 of the docking station 302 or other external device 300. Moreover, the detector 240 may be located outboard of both the handheld device 210 and the docking station 302, but placed in communication with either or both of the devices 210,302 to detect connection between the two devices 210,302. In the embodiment shown in FIG. 4, the detector 240 is located inside the housing 212 of the handheld gaming device 210. The detector 240 detects the interfacing of the handheld device 210 to the external input device 300 via their respective connection ports 231,331. Moreover, the detector 240 also detects communications between the two devices 210,300, whether such communication takes place via the connection ports 231,331, wirelessly, or otherwise. In this way, the detector 240 can detect either or both of the physical and communication connections between the devices 210,300.

In this embodiment, the detector 240 detects connection by receiving a signal from the hardware of the handheld device 210 signaling that the handheld device 210 is both physically connected to and in communication with the docking station 302. In FIG. 4, because the two devices 210,302 are not connected and not in communication with one another, the detector 240 in the handheld device 210 is not detecting the docking station 302. Because the docking station 302 is not detected by the detector 240, the first format of the wagering game continues to be displayed on the primary display 214 of the handheld gaming device 210, as described above in relation to FIG. 3. In other embodiments, the detector 240 may receive a signal to detect the communication of the external device 300 from any number of signaling methods, including hardware signals through wired and wireless transmissions, or software signals. For example, in one alternate embodiment, the detector 240 may detect that the handheld device 210 and the external device 300 are within a predetermined distance or range of one another using one or more wireless communication and/or sensing technologies.

Figure 5:
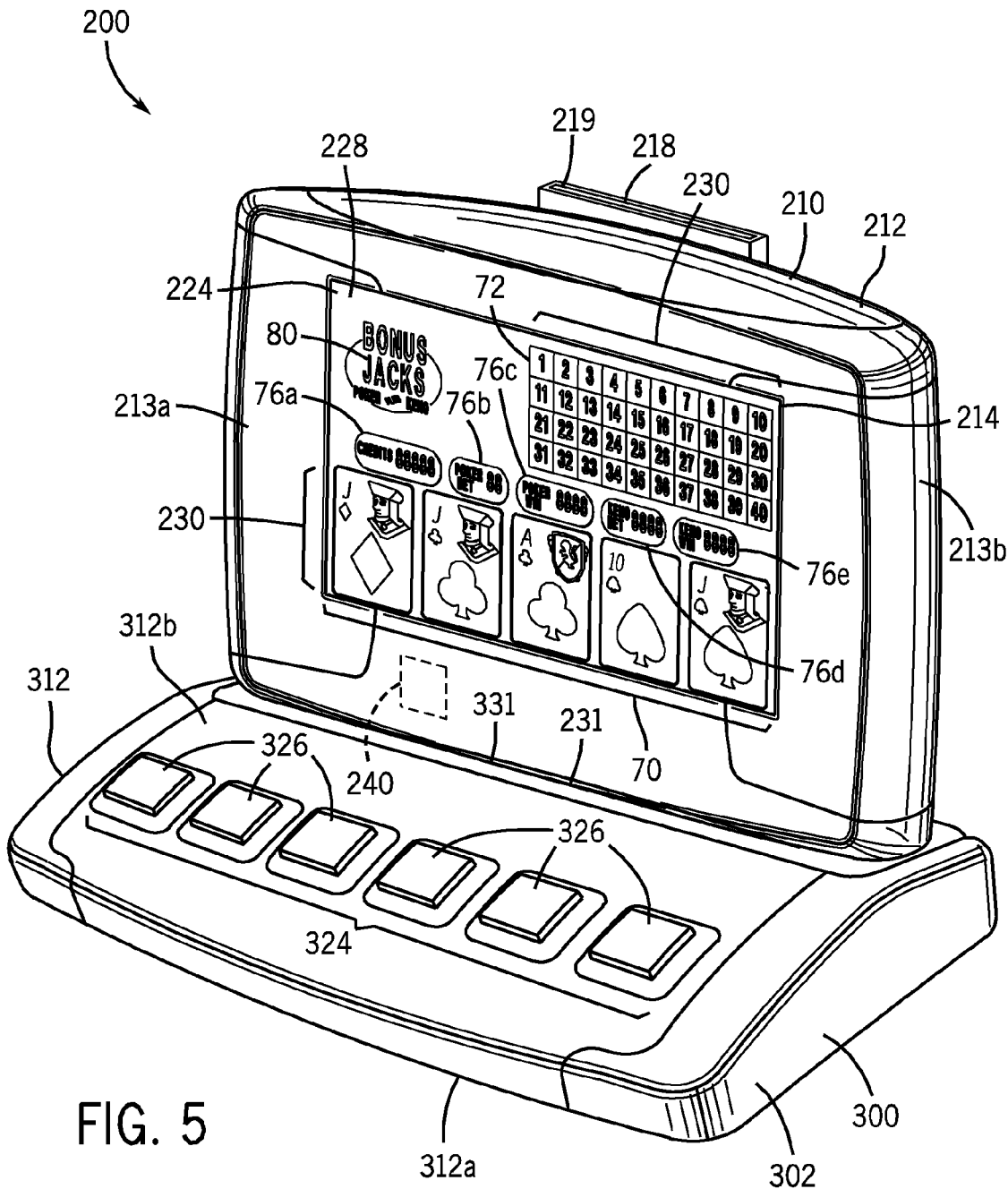
FIG. 5 is another perspective view of the gaming system of FIG. 4, showing a handheld gaming device in communication with an external input device.

Turning to FIG. 5, another view of the handheld gaming system 200 is depicted. In this view, the handheld gaming device 210 has been connected with or "docked" with the docking station 302. By setting the bottom end (the external connection port 231) of the handheld device 210 into the cradle shaped external connection port 331 of the docking station 302, the two devices 210,302 are now docked. When docked, the two devices 210,302 are mated or connected physically, and in communication with one another so as to be able to exchange data and information back and forth. Because the two devices 210,302 are docked and in communication with one another, the detector 240 detects the docking station 302 via a hardware signal. In response to the detector 240 detecting such connection, the controller (not shown) causes the primary display 214 of the handheld gaming device 210 to change from displaying the first format of the wagering game to displaying a second format of the wagering game, shown in FIG. 5.

The second format of the wagering game involves displaying the wagering game on the primary display 214 in a way that is different, or visually distinct from the first format of the wagering game. The game played in the second format of the wagering game is the same as the game played in the first format of the wagering game. As seen in FIG. 5, the wagering game is still the combination poker/keno game that was depicted in FIGS. 3-4. However, the appearance of the wagering game has changed from the first format of the wagering game to the second format of the wagering game, in response to the docking of the handheld gaming machine 210 with the docking station 302.

The second format of the wagering game is displayed on the primary display 214 in FIG. 5. The display 214 now includes a plurality of cards 70 for the poker game along the bottom of the display 214. In the second format of the wagering game, the keno game 72 is displayed in the upper right hand corner of the display 214. Across the center of the display 214 are a plurality of information fields 76, which include a credit meter 76a, a poker bet meter 76b, a poker win meter 76c, a keno bet meter 76d, and a keno win meter 76e. These information fields 76 provide information to the player via the primary display 214 related to the status of present and past games played on the handheld device 210, and may be the same as or different from the information fields 76 of the first format of the wagering game. The display 214 also includes a logo or theme mark 80 located in the upper left hand corner of the display 214 indicating the name and theme of the game, which in this embodiment is "Bonus Jacks— Poker plus Keno" which was not present in the first format (see FIG. 3). In this embodiment, the second format of the wagering game does not include any of the same input selections 74 as the first format, but may include other input selections via the touch screen 228 and soft keys 230.

As seen in FIG. 5, because the handheld gaming device 210 is docked with the docking station 302, and thus the player input device 324 of the docking station 302 is now active to control the handheld gaming device 210. The push buttons 326 of the docking station 302 are activated, and the player may make various selections via the buttons 326 to control the handheld device 210 in a similar fashion as when the first format of the wagering game was displayed. However, because the external input device 300 is equipped with its own player input device 324, the input selections 74a-h, which comprised a portion of the player input device 224 when the handheld device 210 was in the first format of the wagering game, have been removed. This change of format from the first format to the second format allows the area of the primary display 214 to be maximized and used most efficiently to display active elements of the game. Moreover, unnecessary or redundant elements (such as the input selections 74 of the first format and the buttons 326 of the docking station) have been eliminated by removing such elements from the display 214 when the format is changed from the first format to the second format. The push buttons 326 may also include information on them such as labels, graphics, or other text, including but not limited to the ranks and suits of cards to which the buttons 326 correspond. Moreover, the push buttons 326 may display a first set of information when the docking station 302 is connected with the handheld device 210 and other sets of information when such connection is not present. For example, when the docking station 302 is not in use (not connected with a handheld device 210), the buttons may display graphics which may comprise an attract mode, a wagering game, an entertainment game or video display, or other graphic content. The graphics displayed on the buttons 326 may be stored internally in memory inside the docking station 302, or may be received by the docking station 302 from any external device, including but not limited to a handheld device 210, server, or other device. Moreover, such graphics may be received through either wired or wireless communications with such devices, as discussed herein. A handheld device 210 connected with the docking station 302 may also be used as a hub to establish communication between the docking station 302 and other external devices such as a bill acceptor or ticket printer.

One of the benefits of the present invention is that the changing of the display 214 from the first format to the second format is done automatically in response to the detection of the connection between the handheld device 210 and the external input device 300. Thus, no input is required from the player to cause the format of the wagering game to be changed. Similarly, when the handheld gaming device 210 is removed from the docking station 302, the primary display 214 is caused to change back from the second format to the first format of the wagering game. This is done in response to the detector 240 no longer detecting connection between the handheld device 210 and the external input device 300. In this way, the handheld gaming system 200 is configured so as to automatically change between different formats of displaying the wagering game to the player based upon a detected "state" of the handheld device 210 as either docked or undocked (connected with or not connected with the external input device 300).

Figure 6:
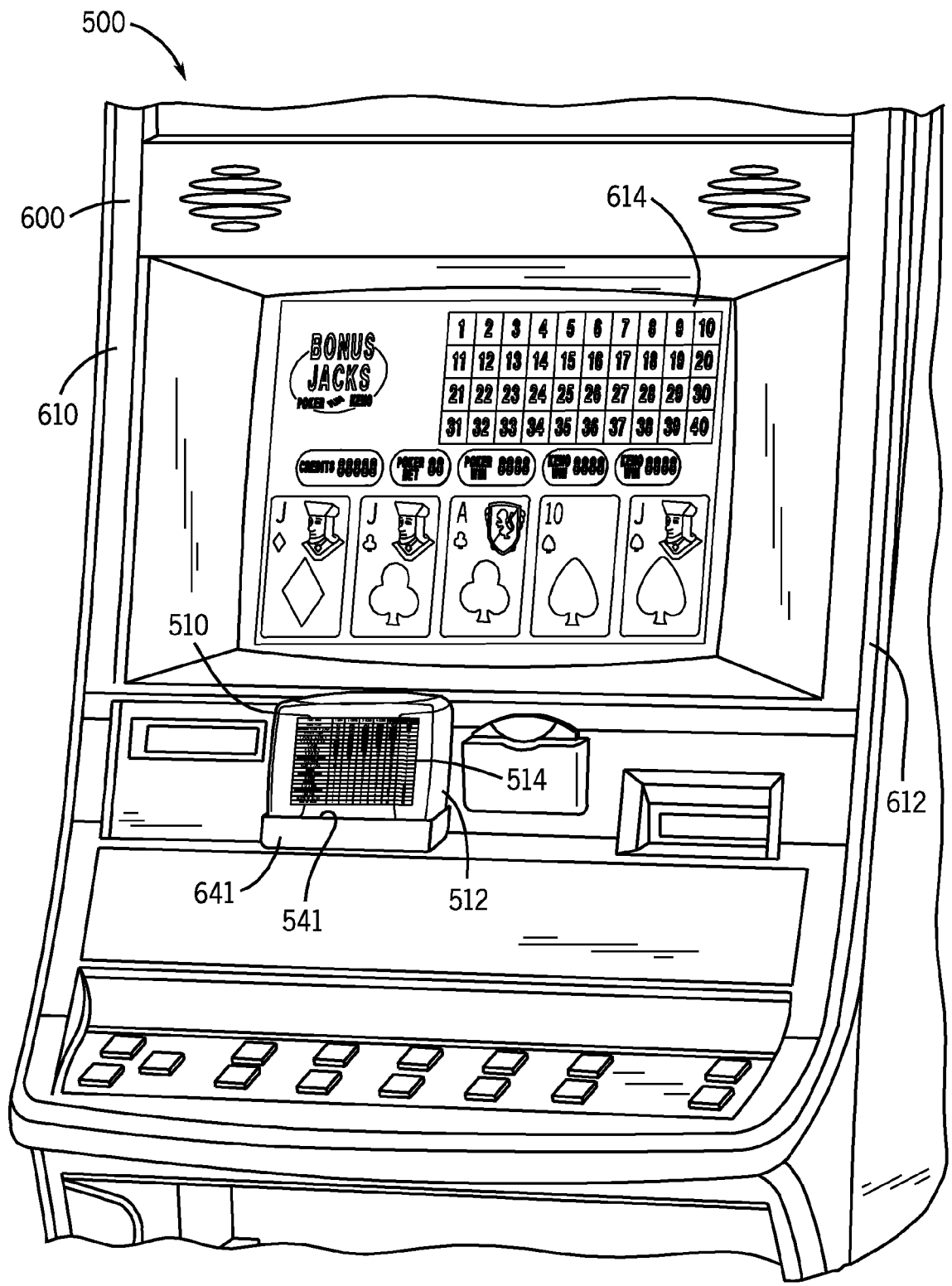
FIG. 6 is a perspective view of an alternate embodiment of a gaming system according to the present invention.

In FIG. 6, an alternate embodiment of a handheld gaming system 500 is shown. In this embodiment, the system 500 comprises a handheld gaming device 510 and an external input device 600 which in this case is a freestanding gaming machine 610 similar to the one in FIG. 1a. The freestanding gaming machine 610 comprises a housing 612, and includes an external connection port 641 located on a front face of the housing 612. The freestanding gaming machine 610 also includes a primary display 614 and may optionally include one or more secondary displays (not shown). As before, the handheld gaming device 510 includes a housing 512, a primary display 514, a touch screen overlying the display 514, and an external connection port 541 on a bottom surface of the housing 512. The external connection port 541 on the handheld device 510 is complimentary to the external connection port 641 on the freestanding gaming machine 610 such that the two devices 510,610 may be physically connected and placed in communication with one another.

Because the handheld device 510 is connected to the freestanding gaming machine 610 via the connection ports 541, 641, the detector (not shown) detects the communication there between, as described herein with relation to FIG. 5. In response thereto, the controller (not shown) in communication with the primary display 514 of the handheld device 510 causes the display 514 to change from the first format of the wagering game (see FIG. 3) to a third format of the wagering game (seen on the primary display 514 in FIG. 6). The third format of the wagering game depicts only a portion of the wagering game, which in this embodiment is a pay table displayed on the display 514. Other portions of the wagering game are displayed on the primary display 614 of the freestanding gaming machine 610. Secondary displays, if any, of the freestanding gaming machine 610 may also be used to display yet other portions of the wagering game. Because of the larger size of the primary display 614 of the freestanding gaming machine 610, the major components of the wagering game and the game play are displayed thereon to maximize viewing enjoyment. For example, the second format of the wagering game (see FIG. 5) is displayed on the display 614 in FIG. 6. Alternatively, the display 614 may be used to display a different, or fourth, format of the wagering game. Due to the relatively smaller size of the primary display 514 on the handheld device 510, less critical components of the wagering game, such as the payable, are displayed thereon. In alternate embodiments, the third format of the wagering game may include bonus features, game featurettes, entertainment displays, wagering and game statistics, game data, player information data, casino information, or other information.

In the foregoing exemplary embodiments, the handheld gaming systems 200, 500 are shown including a handheld gaming device 210,510 interfacing and communicating with external input devices 300,600 which include a docking station 302 and a freestanding gaming machine 610. However, the handheld gaming system in alternative embodiments may include the handheld gaming device 200 in communication with a variety of other external devices. For example, the handheld device 200 may interface directly with another handheld device of the same or similar construction. Such an interface may allow the player input device 224 of one handheld device to provide selections and affect the displayed game play on the other device. In another version of this alternative embodiment, communications between the two handheld devices 200 may occur either over a wired or wireless connection such that two players of the devices 200 may play or participate in a single wagering game. In such a configuration, the two displays 214 of the two handheld devices 200 may display the same differing viewpoints, viewing angles, perspectives, or formats of the wagering game. Moreover, the two displays 214 may present a unified image of the wagering game, as is described in U.S. Pat. Nos. 6,254,481 and 6,569,018 to Jaffe and assigned to WMS Gaming Inc., which are incorporated herein by reference in their entirety. Similarly, the primary display 214 of a handheld device 210 may present such a unified image using its own display 214 as well as any other display with which it is in communication, such as a display on an external device 300, or a community display.

As described herein, the controller reconfigures the display from a first format to a second format of the wagering game in response to detection of communications with an external input device. In the exemplary embodiments, the reconfiguring from the first format to the second format is described, among other things, as removing some or all of the input selections displayed on the display in the first format, such that fewer or none, respectively, are displayed in the second format of the wagering game. In alternative embodiments, however, the reconfiguration may comprise a variety of different alterations to the graphics displayed on the primary display 214. For example, input selections may be added to the display. Additionally, the various game elements, selections, symbols and information on the display 214 may be relocated around the display. Those elements may also be resized, highlighted, or rearranged when the display 214 is changed from the first to the second format of the wagering game. Different themes, episodes, versions or color schemes may be applied in the second format as compare to the first format of the wagering game. Moreover, differing peripherals may be activated and deactivated in the various formats.

In yet another alternative embodiment, the handheld gaming system 200 includes a server which is in communication with the handheld gaming device 210 and the external input device 300. The server may communicate with such devices either through a wired or wireless connection as described herein. In such an alternative embodiment, the handheld device 210 and the external input device 300 need not communicate directly with one another but may instead interact via the intermediate server. For example, the server may monitor the "state" of the handheld device 210 to detect whether it is in communication with one or more external input devices 300. A detector 240 located in either or both of the handheld device 210 or the external input device 300, or in the server, may send a signal to the server indicating that the handheld device 210 is connected to, docked, or otherwise linked to the external device 300. The server may then cross-reference an internal or external database or table for the proper format which the handheld device 210 should display given the "state" that reports to be in (i.e. docked/connected versus undocked/not connected). Once the server retrieves the appropriate format of the wagering game to be displayed on the handheld device 210 which corresponds to the then-current "state" of the device 210, the server may instruct the handheld device 210 as to the proper format of the wagering game to display on the primary display 214. The server may send a signal to the handheld device 210 signaling it as to which format of the wagering game to display from an internal memory and/or processor of the device 210, or alternatively, the server may "push" down to the handheld device 210 over the network, the graphics corresponding to the proper format of the wagering game to be displayed on the display 210. In this embodiment, the handheld gaming device 210 need not communicate with directly with the external input device 300. If the docking or connection is undone, reversed or removed, the detector signals the server regarding the disconnection, and the server in turn reconfigures the format of the wagering game displayed on the display 214 of the handheld device 210 to correspond to the correct format of the wagering game for the "undocked" configuration of the device 210 (such as displaying the input selections 74 in FIG. 3, for example).

In addition to the automated format configuration changes described herein, in yet another alternate embodiment, the handheld device 210 may include one or more sensors which detect the presence or contact of a player with the housing 212 of the device 210. For example, the device 210 may include sensors in the grips 213a,b of the device 210 which are triggered when touched, held, or squeezed by a player. The handheld gaming device 210 may then be configured so as to reconfigure from a first format of the wagering game to a second format of the wagering game in response to such contact recognized by the sensor. In this way, the sensor may be used to automatically reconfigure the wagering game between formats. For example, the handheld device 210 may be configured such that so long as the sensor sense contact from a player on the grips 213a,b, the primary display 214 displays the first format of the wagering game as seen in FIG. 3. Once a player releases the grips 213a,b, however, the device 210 is reconfigured to display the second format of the wagering game, as seen in FIG. 5. In this way, the device 210 only displays the input selections 74 proximate the grips 213a,b (thus, proximate the player's fingers), when the grips 213a,b are actually being used to hold the device 210. When the grips 213a,b are released (for example the device 210 is set on a tabletop), the sensor detects such release, and in response thereto, the input selections 74 are removed and the display 214 displayed the second format of the wagering game. If the released grip 213 is once again contacted by the player, the sensor detects the contact and the input selections 74 are restored on the display 214. This alternative embodiment allows the device 210 to be constantly configured to a format which is most conducive to receiving player input in a logical, efficient, and comfortable manner.

In the embodiments described with reference to FIGS. 3-6, the handheld gaming systems 200,500 include default settings for the various formats of the wagering games. For example, as described, the default format for the handheld gaming device 210 in an undocked or disconnected state, as seen in FIGS. 3-4, is the first format of the wagering game which includes the input selections 74 displayed on the display 214. However, in addition to these default settings, the player may be provided with any number of customization options which may override the default settings of the systems 200,500. In one such embodiment, the player may be permitted to select and match various formats of the wagering game with various states of the handheld device 210 as described. Thus, as the handheld device 210 is connected with and disconnected from various external devices 300,600, the display 214 will reconfigure to display the customized formats of the wagering game, as selected by the player. The player's customization settings may be saved in the handheld device 210, or in a player account associated with the player, and recalled by the player at any time during or prior to game play. The customization settings may also be automatically invoked in response to the handheld device 210 "recognizing" or identifying the player, through one of many known player identification techniques (e.g. reading a card, reading a biometric identifier, receiving a username and password, etc.)

The customization options offered to the player may also include the ability to configure certain aspects of the individual formats of the wagering game displayed. For example, looking at the first format of the wagering game displayed in FIG. 3, the player may wish to reconfigure the HOLD buttons 74*b*-*f* and the DEAL/DRAW button 74*h* so as to be located as is most comfortable or convenient to the player. It maybe that right-handed players, for example, prefer the first format of the wagering game as shown in FIG. 3 wherein the DEAL/DRAW button 74*h* is activated by the players right thumb, while left-handed players prefer the DEAL/DRAW button 74*h* to be on the left side of the display 214 so as to be activated by the player's left thumb. In such an alternative embodiment, the player is provided the opportunity to specify the arrangement of some or all of the input selections 74, or other game elements and graphical displays within some or all of the formats of the wagering game. In this way, the customization settings maximize the efficiency, comfort and enjoyment of the wagering game for all players.

Each of these embodiments and obvious variations thereof is contemplated as falling within the spirit and scope of the claimed invention, which is set forth in the following claims.

What is claimed is:

1. A gaming system comprising:
   a handheld gaming device comprising a first display for displaying a wagering game;
   a wager input device in communication with the handheld gaming device;
   a detector for detecting at least one external input device connected to the handheld gaming device; and
   a controller operative to cause the first display to display a first format of the wagering game if connection with the at least one external input device is not detected by the detector, and cause the first display to display a second format of the wagering game if connection with the at least one external input device is detected by the detector.

2. The gaming system of claim 1, wherein the first format comprises the wagering game displayed on a first portion of the display and a plurality of input selections displayed on a second portion of the display.

3. The gaming system of claim 2, wherein the second format comprises the wagering game displayed on the first and second portions of the display.

4. The gaming system of claim 3, wherein the external input device comprises a docking station, the docking station including a plurality of buttons.

5. The gaming system of claim 4, wherein the plurality of buttons correspond to input selections in the wagering game.

6. The gaming system of claim 1, wherein the external input device comprises a docking station, the docking station including a plurality of buttons, wherein the handheld gaming device is connected to the docking station.

7. The gaming system of claim 1, wherein the external input device comprises a freestanding gaming machine, the freestanding gaming machine including a second display.

8. The gaming system of claim 7, wherein the controller is further operative to
   (i) cause the first display to display a third format of the wagering game and
   (ii) cause the second display to display one of:
      (a) the second format of the wagering game or
      (b) a fourth format of the wagering game.

9. The gaming system of claim 8, wherein the third format of the wagering game comprises a pay table.

10. The gaming system of claim 7, wherein the handheld gaming device is physically connected to the freestanding gaming machine.

11. The gaming system of claim 1, wherein the connection between the external input device and the handheld gaming device is wireless.

12. A method of conducting a wagering game on a gaming system, the method comprising:
    receiving a wager via a wager input device;
    displaying a first format of the wagering game on a display of a handheld gaming device;
    detecting at least one external input device connected to the handheld gaming device; and
    in response to the detection, reconfiguring the display to display a second format of the wagering game.

13. The method of claim 12, further comprising providing a touch screen overlaying at least a portion of the display, the touch screen for receiving user selections.

14. The method of claim 13, wherein the first format of the wagering game includes a plurality of input selections on the display of the handheld gaming device.

15. The method of claim 14, wherein the reconfiguring step comprises removing at least a portion of the plurality of input selections from the display.

16. The method of claim 14, wherein the reconfiguring step comprises one of relocating, resizing, highlighting, or rearranging at least a portion of the plurality of input selections on the display.

17. The method of claim 12, wherein the second format is visually distinct from the first format.

18. The method of claim 12, wherein the external input device is one of a docking station, a freestanding gaming machine, or a second handheld gaming device.

19. The method of claim 12, further comprising:
    providing a server in communication with at least one of the handheld gaming device or the external input device;
    transmitting to the server the detection of the communication; and
    receiving at the handheld gaming device instructions from the server for reconfiguring the display to display the second format of the wagering game.

20. A non-transitory computer readable storage medium encoded with instructions for directing a gaming system to perform the method of claim 12.

* * * * *